United States Patent [19]

Tokura et al.

[11] Patent Number: 5,730,691
[45] Date of Patent: Mar. 24, 1998

[54] TURRET TYPE OF MACHINE TOOL

[75] Inventors: Kazuto Tokura; Yosiharu Watabe; Katsuyuki Abe; Hitoshi Hashimoto, all of Saitama-ken, Japan

[73] Assignee: Honda Giken Kogyo Kabushiki Kaisha, Tokyo, Japan

[21] Appl. No.: 754,929

[22] Filed: Nov. 25, 1996

[30] Foreign Application Priority Data

Nov. 27, 1995 [JP] Japan ................... 7-307181
Oct. 29, 1996 [JP] Japan ................... 8-286846

[51] Int. Cl.$^6$ ................................ B23Q 3/157
[52] U.S. Cl. ........................... 483/56; 29/40
[58] Field of Search ................ 483/55, 56, 54; 29/39, 40, 26 A, 22 C; 408/35; 82/159, 158, 211

[56] References Cited

U.S. PATENT DOCUMENTS

| | | | |
|---|---|---|---|
| 3,830,584 | 8/1974 | Ohlig et al. | 408/35 |
| 4,135,278 | 1/1979 | Kitamura | 29/26 A |
| 4,419,797 | 12/1983 | Sigloch et al. | 483/56 X |
| 4,873,756 | 10/1989 | Yamane et al. | 483/56 |
| 5,125,142 | 6/1992 | Kosho et al. | 29/40 |
| 5,168,614 | 12/1992 | Thumm | 29/40 |

FOREIGN PATENT DOCUMENTS

| | | | |
|---|---|---|---|
| 196344 | 8/1908 | Japan | 483/56 |
| 53-26864 | 8/1978 | Japan . | |
| 5285711 | 11/1993 | Japan | 29/40 |
| 1047648 | 10/1983 | U.S.S.R. | 483/56 |
| 2 273 067 | 6/1994 | United Kingdom . | |

*Primary Examiner*—William R. Briggs
*Attorney, Agent, or Firm*—Armstrong, Westerman, Hattori, McLeland & Naughton

[57] ABSTRACT

In a turret type of machine tool having a turret head which can be rotated for indexing to selectively index an arbitrary one of tool mounting members provided in a plurality of circumferential portions into a machining position which coincides with a predetermined radial direction, the construction of the turret head is simplified to reduce the cost and increase the reliability. A first supporting body is provided which is connected to a moving mechanism which advances or recedes the turret head along an axis of machining coinciding with the axial line of the tool mounting member at the machining position. A second supporting body which is movable along the axis of machining is supported on the first supporting body, and the turret head is rotatably supported on the second supporting body so as to be rotated for indexing. A spindle head is fixed to the first supporting body such that a spindle to be supported on the spindle head coincides with the axis of machining. At least a front end of the spindle head is contained in a space inside the turret head. A tool holder to be held by the tool mounting member in the machining position is engaged with, or detached from, the spindle by the movement of the second supporting body relative to the first supporting body.

8 Claims, 11 Drawing Sheets

TURRET TYPE OF MACHINE TOOL

BACKGROUND OF THE INVENTION

1. Field of the Invention

The present invention relates to a turret type of machine tool having a turret head which can be indexed.

2. Description of the Related Art

A turret type of machine tool is ordinarily constituted in the following manner. Namely, an arbitrary one of tool mounting members which are provided in a plurality of circumferential portions of a turret head is indexed to a predetermined machining position by the indexing movement of the turret head. When an axial line of the tool mounting member at the machining position is defined as an axis of machining, the turret head is moved forwards or advanced in the direction of the axis of machining by a feed table. A workpiece is thus machined by a tool which is mounted on a tool holder to be held by the tool mounting member that is present in the machining position.

In a conventional turret type of machine tool, the following arrangement is employed as disclosed in Japanese Published Examined Patent Application No. 26864/1978. Namely, a turret head is rotatably supported on a supporting body which is fixed to a feed table. In each of tool mounting members, there is rotatably supported a spindle which has a front-end tapered hole to be engaged with a rear-end tapered portion of the respective tool holders. The turret head is provided therein with a drive shaft which is rotatably supported by the supporting body and which is coaxial with, or parallel with, an axis of machining. The drive shaft is connected via a clutch mechanism to the spindle of a tool mounting member that is present in the machining position. The tool holder can thus rotate via the spindle.

In the above-described conventional turret type of machine tool, a spindle is respectively rotatably held in each of a plurality of tool mounting members of the turret head. Therefore, it becomes complicated in construction, high in cost, and heavy in weight, with the result that the speed of the indexing cannot be increased any more.

Further, since the clutch mechanism is interposed in a driving mechanism for the spindle, the operation of the machine tool sometimes stops due to a mechanical failure in the clutch mechanism. Still furthermore, since a fitting portion on the front end of the spindle for fitting with the tool holder is exposed to the outside of the turret head, inclusion of foreign matters such as cut chips into this fitting portion is likely to occur. A consequent eccentricity of the tool holder due to the inclusion of the foreign matters will sometimes affect the machining accuracy, resulting in a poor reliability.

SUMMARY OF THE INVENTION

In view of the above disadvantages of the conventional art, the present invention has an object of providing a turret type of machine tool which is high in reliability and low in cost.

In order to solve the above problems, the present invention is a turret type of machine tool comprising: a turret head having tool mounting members in a plurality of circumferential portions thereof; a supporting body for rotatably supporting the turret head such that an arbitrary one of the tool mounting members can be selectively indexed to a predetermined machining position; a moving mechanism for advancing or receding the supporting body along an axis of machining, the axis of machining being defined to be an axis of a tool mounting member in the machining position; characterized in: that the supporting body is divided into a first supporting body connected to the moving mechanism and a second supporting body rotatably supporting the turret head such that the second supporting body is supported by the first supporting body in a manner relatively movable along the axis of machining; and that a spindle head for rotatably supporting a spindle is fixed to the first supporting body such that the spindle coincides with the axis of machining, at least a front end of the spindle head being contained in a space inside the turret head, whereby a tool holder held in a tool mounting member that has been indexed to the machining position is engaged with, or detached from, the spindle by a movement of said second supporting body relative to the first supporting body along the axis of machining.

As described above, when the second supporting body is moved relative to the first supporting body, the turret head rotatably supported by the second supporting body is caused to move along the axis of machining relative to the spindle head fixed to the first supporting body. The tool mounting member present in the machining position is thus moved towards, or away from, the spindle head, and the tool holder held in the tool mounting member is engaged with, or detached from, the spindle.

Further, according to the present invention, since the spindle need not be rotatably supported on the tool mounting member, the turret head can be simplified in construction and becomes cheap in cost and also becomes smaller in weight. Therefore, the rotation for indexing at a higher speed becomes possible and the tool exchanging can be made quickly, resulting in an improved working efficiency. In addition, the spindle according to the present invention can also serve as a driving shaft of the conventional turret type of machine tool. Since the tool holder is directly engaged with, or detached from, the spindle, a clutch mechanism becomes needless. Furthermore, since at least the front end of the spindle head is inserted into (or contained in) the space inside the turret head, there is no possibility that foreign matters get included into the fitting portion between the spindle and the tool holder, resulting in a higher reliability. In this case, if a means is provided for supplying air higher in pressure than atmospheric pressure into the space inside the turret head, it is advantageous in that the inclusion of the foreign matters into the turret head can surely be prevented.

It is possible to move the second supporting body relative to the first supporting body by means of a driving source such as a cylinder or the like. However, if the following arrangement is employed, the driving source for the second supporting body becomes unnecessary to an advantage from the viewpoint of cost. The arrangement in question is that there are further provided: an urging means for urging the second supporting body relative to the first supporting body rearwards along the axis of machining; and a restricting means for restricting at a predetermined position a receding movement, backwards along the axis of machining, of the second supporting body accompanying the first supporting body at a predetermined position, whereby, by further receding of the first supporting body after the second supporting body has receded to the predetermined position, the second supporting body is advanced forwards along the axis of machining relative to the first supporting body so that the tool holder is detached from the spindle.

Further, if a tapered hole for engaging with a tapered portion at a rear end of the tool holder is formed at a front end of the spindle, when the second supporting body is receded relative to the first supporting body to thereby move the tool mounting member that is in the machining position towards the spindle head, the tool holder can be accurately aligned into the spindle due to a centripetal operation of the tapered hole. Therefore, the accuracy of indexing the turret head may be rough, with the result that a positioning mechanism for indexing can be omitted to decrease the cost.

In addition, a bearing may be provided in the tool mounting member to thereby fix the tool holder into the bearing by means of a pressure nut or the like. This arrangement, however, makes troublesome the attaching and detaching of the tool holder. On the contrary, if there are provided an annular body which is provided in the tool mounting member and which receives therein the tool holder with a clearance therebetween, and a pull-lock piece provided in the annular body to prevent the tool holder from being pulled out of position, by engaging with an annular groove formed in an outer circumference of the tool holder, the tool holder can be easily detached only by releasing the pull-lock piece out of the annular groove. The tool exchanging thus becomes easy.

In this case, the pull-lock piece is arranged to be movable in the diametrical direction of the tool holder so as to be engaged with, or detached from, the annular groove. Or else, the following arrangement may be employed. Namely, the pull-lock piece is fixed to the annular body and the tool holder is provided with a vertical groove formed to extend rearwards in an outer circumference thereof such that the tool holder can be pushed into, or pulled out of, the annular body in a state in which the vertical groove coincides with the pull-lock piece. In the latter arrangement, in order to prevent the tool holder from dropping out of position, it is necessary to normally hold the tool holder in such a phase that the vertical groove does not coincide with the pull-lock piece. For that purpose, it is desirable to provide the annular body with a rotation-lock piece to hold the tool holder on the annular body in the above-described phase. However, when the tool holder in the tool mounting member that has been indexed to the machining position is rotated in engagement with the spindle, the rotation locking (or rotation prevention) must be released. In this case the rotation-lock piece may be arranged to be engageable with, or detachable from, the tool holder, and the spindle head may be provided with a cam member for releasing the rotation-lock piece of a tool mounting member that is present in the machining position when the turret head is receded rearwards along the axis of machining relative to the spindle head. Then, the rotation prevention is automatically released when the tool holder is engaged with the spindle head.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
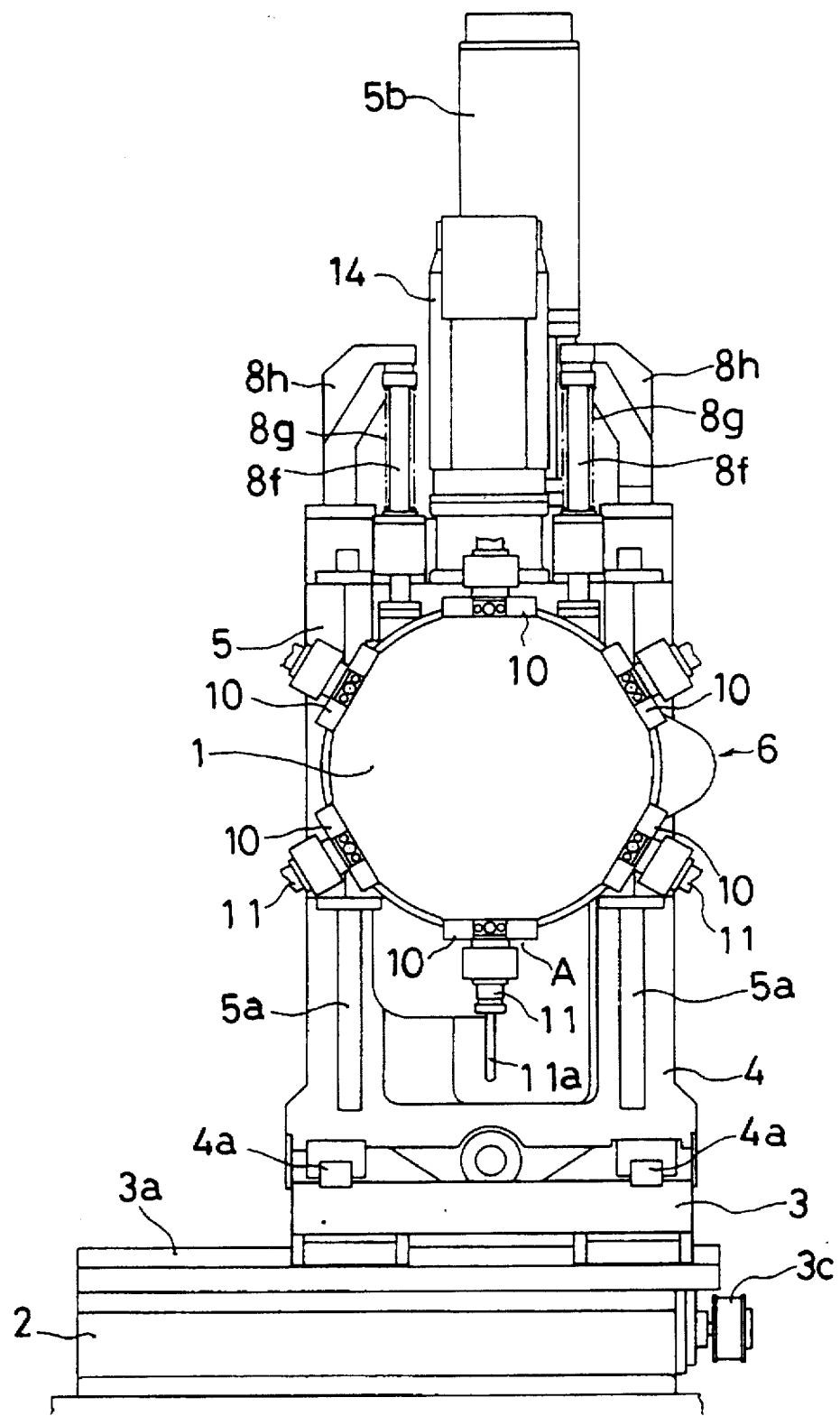
FIG. 1 is a front view of a turret type of machine tool according to a first embodiment of the present invention.
Figure 2:
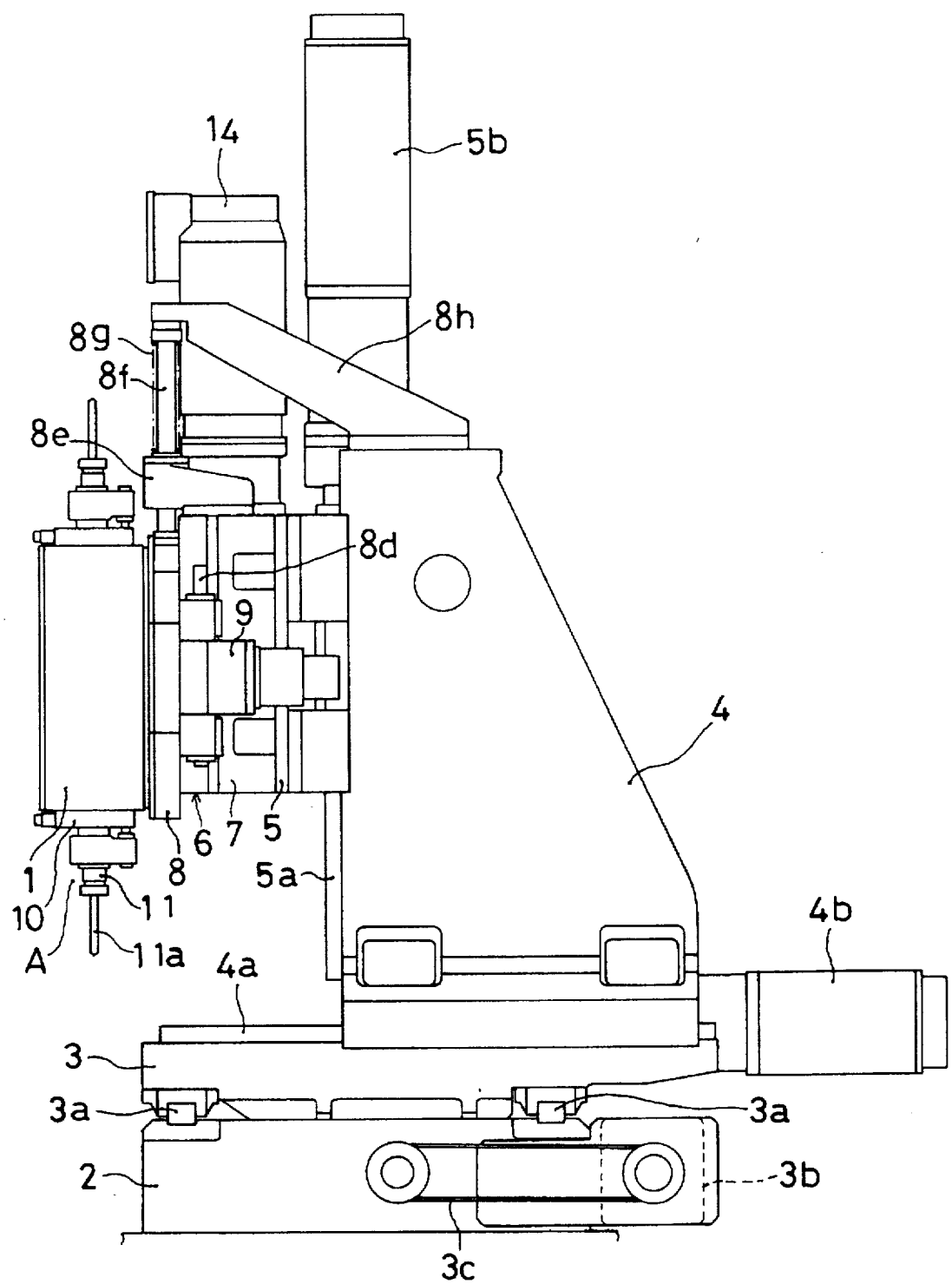
FIG. 2 is a right-side view thereof.
Figure 3:
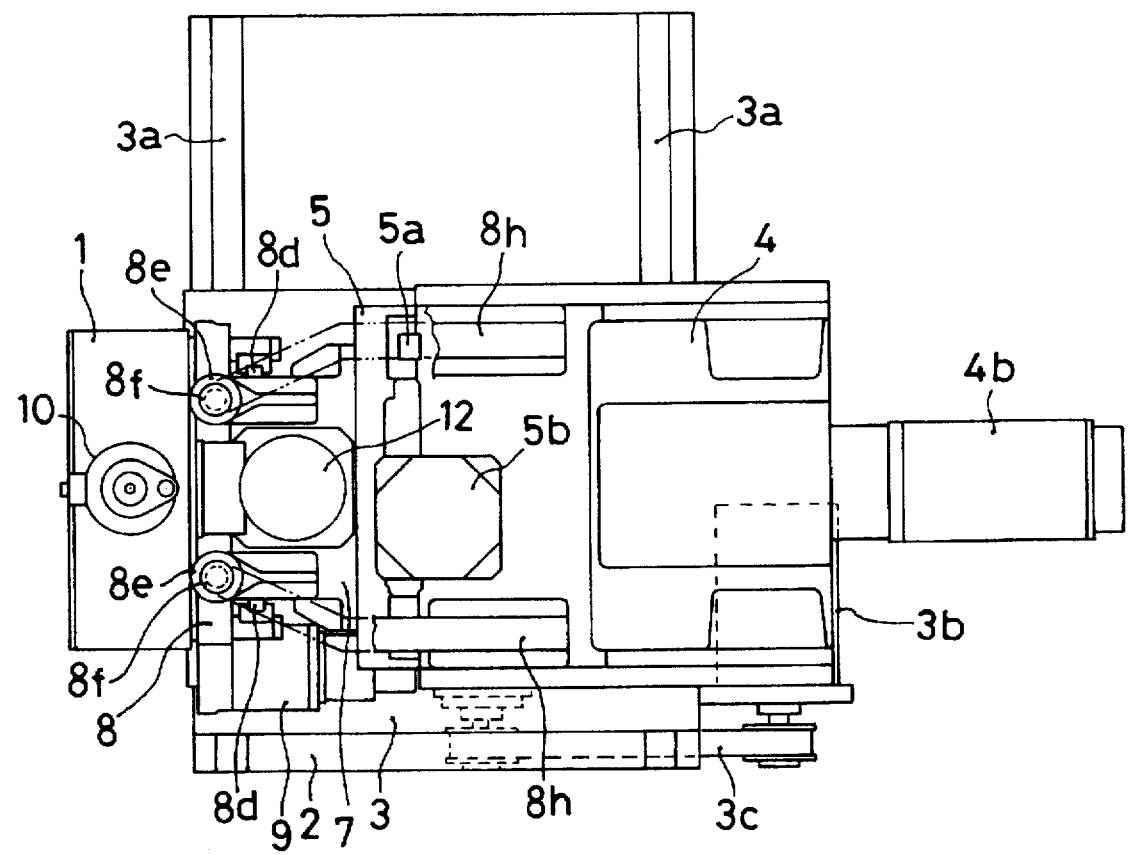
FIG. 3 is a plan view thereof.

FIGS. 1 through 3 show a turret type of machine tool in which a turret head 1 can be controlled for movement in a back and forth (forward and backward) direction, in a lateral (sidewise) direction, and in a vertical (up and down) direction. A bed 2 is provided thereon with a shift table 3 which is supported so as to be movable in the lateral direction via guide rails 3a. The shift table 3 is provided thereon with a shift column 4 which is supported so as to be movable in the back and forth direction along guide rails 4a. The shift column 4 is provided on a front surface thereof with an elevating table 5 which is supported so as to be movable in the vertical direction. On the front surface of the elevating table 5, the turret head 1 is supported via a supporting body 6 so as to be rotatable about an axis in the back and forth direction. The shift table 3, the shift column 4, and the elevating table 5 are moved respectively by servomotors 3b, 4b, 5b via ball screw mechanisms. The ball screw mechanism for the shift table 3 is connected to the servomotor 3b via a belt 3c.

Figure 4:
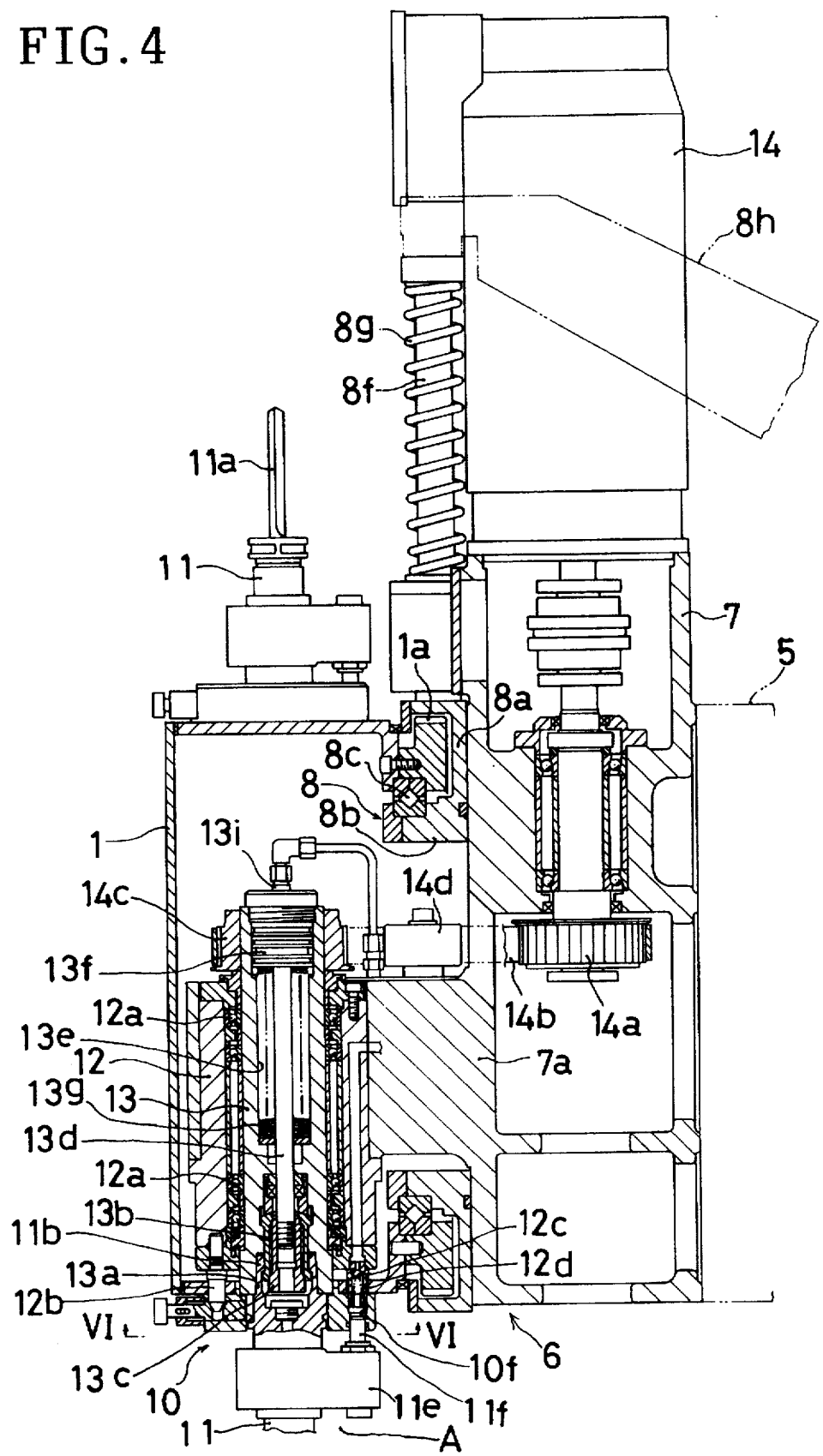
FIG. 4 is an enlarged cross-sectional view of an important portion thereof.

As shown in FIG. 4, the supporting body 6 is divided into a first supporting body 7 which is fixed to the front surface of the elevating table 5, and a second supporting body 8 which is provided in front of the first supporting body 7. The second supporting body 8 is formed into a cylindrical shape having a flanged portion 8a which slidably contacts the front surface of the first supporting body 7, and a cylindrical portion 8b which protrudes forwards out of the flanged portion 8a. A bearing 8c is mounted on an outer circumference of the cylindrical portion 8b. The turret head 1 is rotatably supported by fitting to the bearing 8c a ring gear 1a which is fixed to the rear surface of the turret head 1. On the second supporting body 8, there is mounted, as shown in FIGS. 2 and 3, an index motor 9 which has that gear (not illustrated) on an output shaft thereof which is engaged with the ring gear 1a. The turret head 1 is thus arranged to be rotatable for indexing by the operation of the index motor 9.

In the turret head 1, tool mounting members 10 are provided in a plurality of circumferential portions (6 portions in the illustrated example). By the indexing of the turret head 1, the tool mounting members 10 can be selectively indexed to a vertically downward machining position A of the turret head 1. The turret head 1 is then lowered by the downward movement of the elevating table 5 to thereby perform machining work such as drilling or the like with a tool 11a which is mounted on a tool holder 11 to be held by the tool mounting member 10 that has been indexed to the machining position A.

The second supporting body 8 is movable in the vertical direction, i.e., in along an axis of machining, relative to the first supporting body 7 along guide rails 8d which are provided on the right and left side surfaces of the first supporting body 7. The second supporting body 8 is provided, in a vertically elongated manner, with a pair of right and left guide bars 8f which are inserted into a pair of right and left guide sleeves 8e mounted on an upper end of the first supporting body 7. A coil spring 8g, as an urging means, is fitted to each of the guide bars 8f in a state in which the coil spring 8g is interposed between the upper end of the guide bar 8f and the guide sleeve 8e. The second supporting body 8 is thus urged upwards relative to the first supporting body 7. Further, on an upper end of the shift column 4, there are provided a pair of right and left stopper arms 8h, as restricting means, which restrict a further upward movement of the second supporting body 8 by abutting of the stopper arm 8h with the upper end of each of the guide bars 8f when the second supporting body 8 is elevated to a predetermined position accompanied by the first supporting body 7. When the first supporting body 7 tries to move further upwards against the urging force of the coil spring 8g after the second supporting body 8 has been elevated to the predetermined position, the second supporting body 8 is moved downwards relative to the first supporting body 7.

Figure 5:
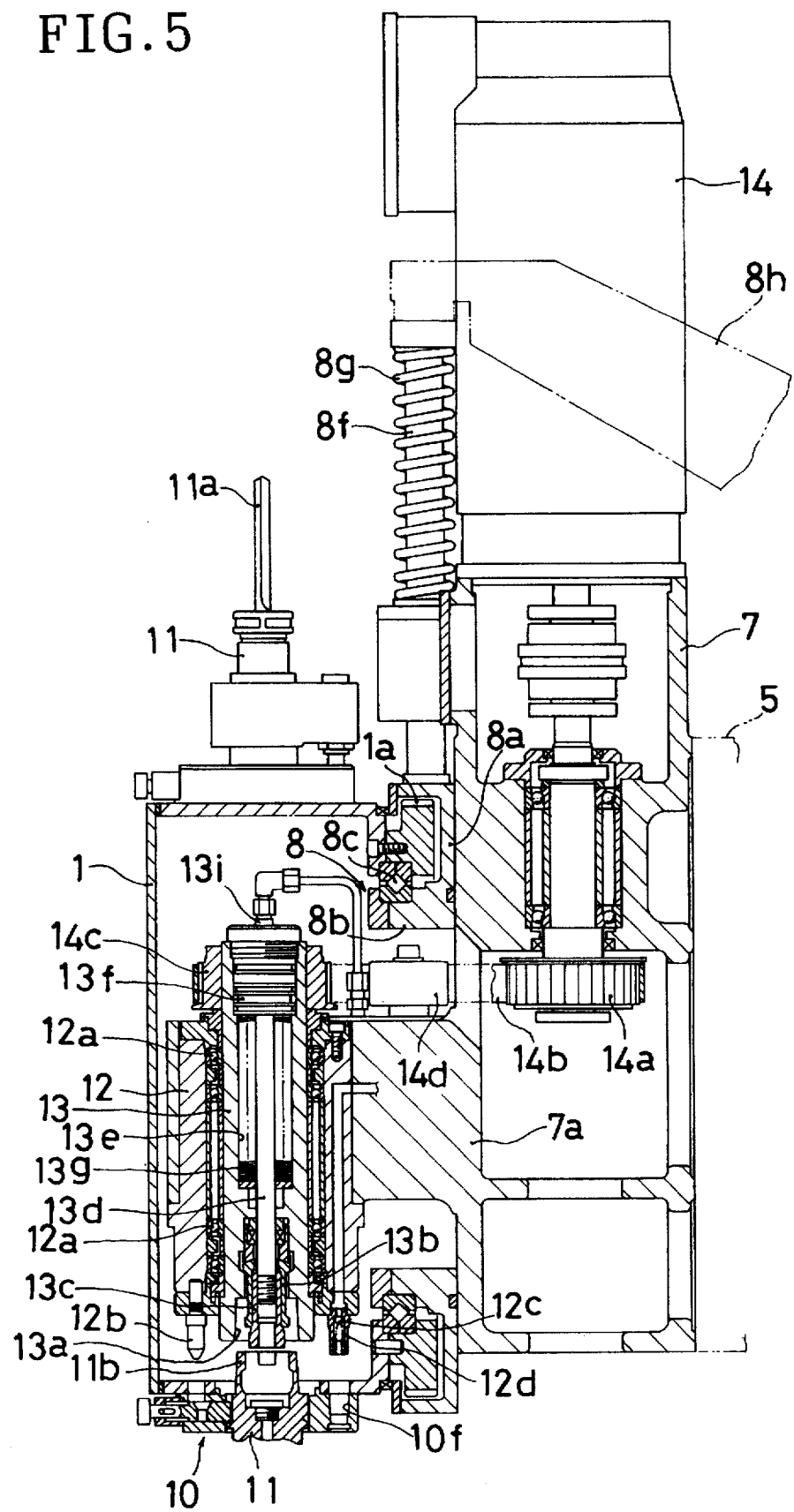
FIG. 5 is a cross-sectional view corresponding to FIG. 4 in a state in which a tool holder is detached from a spindle.

The first supporting body 7 is provided on a front surface thereof, in a projecting manner, with a base 7a while leaving a space inside the second supporting body 8 to allow for a relative movement of the second supporting body 8. The turret head 1 contains in a space therein a spindle head 12 which is fixed to the base 7a. The spindle head 12 is disposed such that a spindle 13 to be rotatably supported in the spindle head 12 coincides with an axis of the tool mounting member 10 at the machining position A, i.e., the vertical axis of machining. Therefore, when the second supporting body 8 and, accordingly, the turret head 1 rotatably supported on the second supporting body 8 are moved upwards by the urging force of the coil spring 8g relative to the first supporting body 7 and, accordingly, relative to the spindle head 12 fixed thereto, the tool holder 11 to be held by the tool mounting member 10 that is present in the machining position A gets engaged with the spindle 13. On the other hand, when the second supporting body 8 is moved downwards relative to the first supporting body 7 with the upward movement of the first supporting body 7 due to the upward movement of the elevating table 5, as described above, the tool holder 11 is released off, or disengaged from, the spindle 13 as shown in FIG. 5.

The spindle 13 is rotatably supported via bearings 12a by insertion into the spindle head 12. On an upper end of the spindle 13, there is mounted a driven pulley 14c which is connected, via a belt 14b, to a drive pulley 14a on an output shaft of a spindle motor 14. The spindle 13 is thus driven for rotation by the spindle motor 14. Reference numeral 14d denotes a guide pulley which is rotatably supported on the base 7a.

On a lower end of the spindle 13, there is formed a tapered hole 13a which is fitted with a tapered portion 11b at a rear end of the tool holder 11. By the upward movement of the second supporting body 8 relative to the first supporting body 7, the tool holder 11 of the tool mounting member 10 that is present in the machining position A is thus arranged to be automatically engaged, with due alignment, with the spindle 13 by the fitting of the tapered portion 11b with the tapered hole 13a. Therefore, the indexing accuracy of the turret head 1 may be made only roughly, with the result that a special positioning mechanism for the indexing becomes unnecessary.

Figure 7:
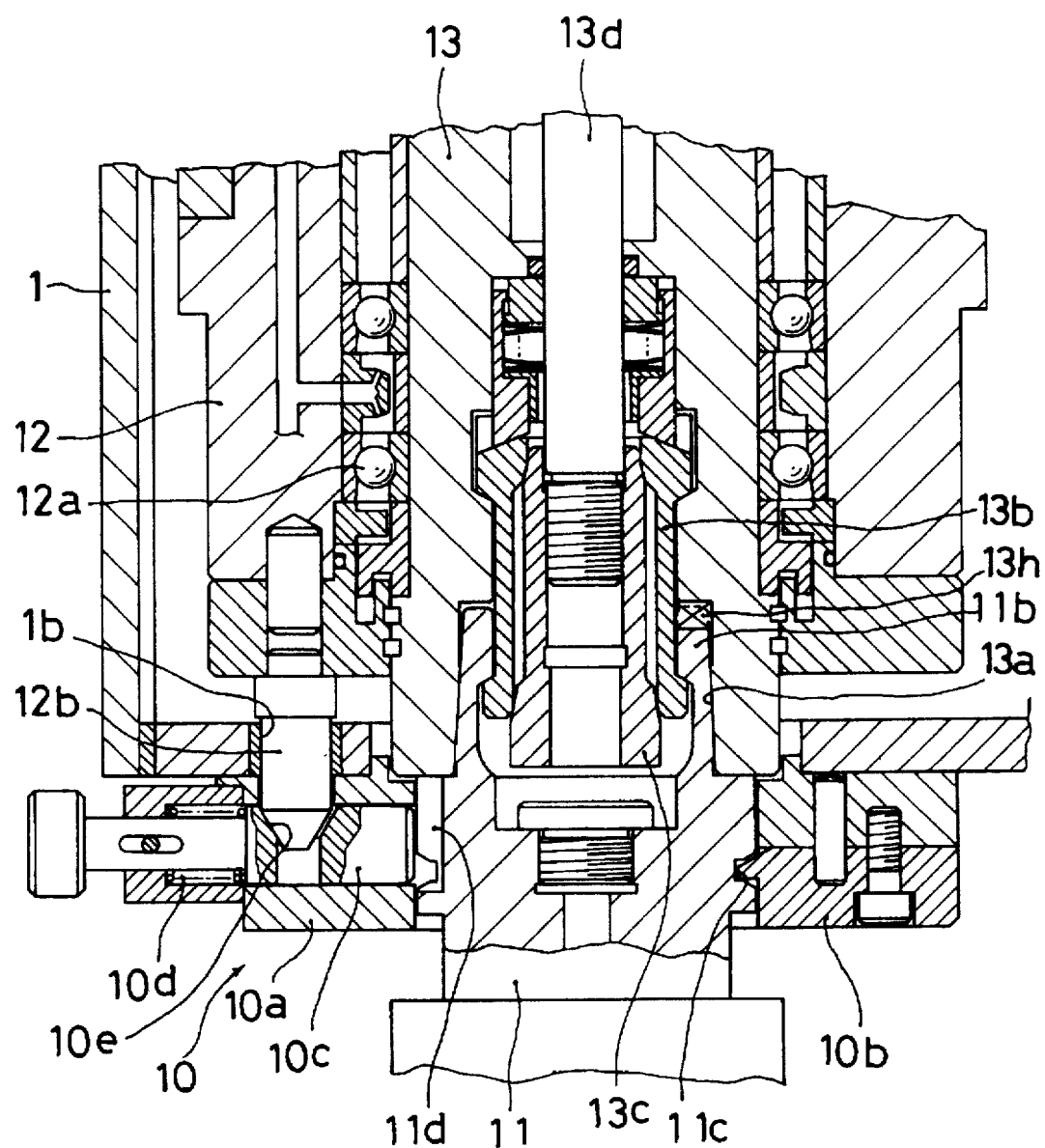
FIG. 7 is an enlarged cross-sectional view taken along the line VII—VII in FIG. 6.

The spindle 13 is further provided with a so-called pull stud mechanism which fixes, through fitting, the tapered portion 11b to the tapered hole 13a. The pull stud mechanism is made up of a collet 13b which can be inserted into a hollow space of the tapered portion 11b, a drawing bar 13d which has connected to its lower end a tapered engaging element 13c to be inserted into the collet 13b, and an operating cylinder 13e to operate the drawing bar 13d. The operating cylinder 13e contains therein coned disc springs 13g which abut from the bottom side with the piston 13f on the upper end of the drawing bar 13d. By means of an upward urging force of the drawing bar 13d due to the coned disc springs 13g, the collet 13b is enlarged in diameter, via the engaging element 13c. As a result, the tapered portion 11b is fixed or seized by fitting to the tapered hole 13a. By downward pushing of the drawing bar 13d by supplying pressurized air from a port 13i on an upper end of the operating cylinder 13e, the collet 13b is reduced in diameter to thereby release the fixing or seizing of the tapered portion 11b. As shown in FIG. 7, at the bottom of the tapered hole 13a, there is attached a key 13h which is engaged with a keyway formed in an end surface of the tapered portion 11b of the tool holder 11. The tool holder 11 is thus surely prevented from rotating relative to the spindle 13.

Figure 6:
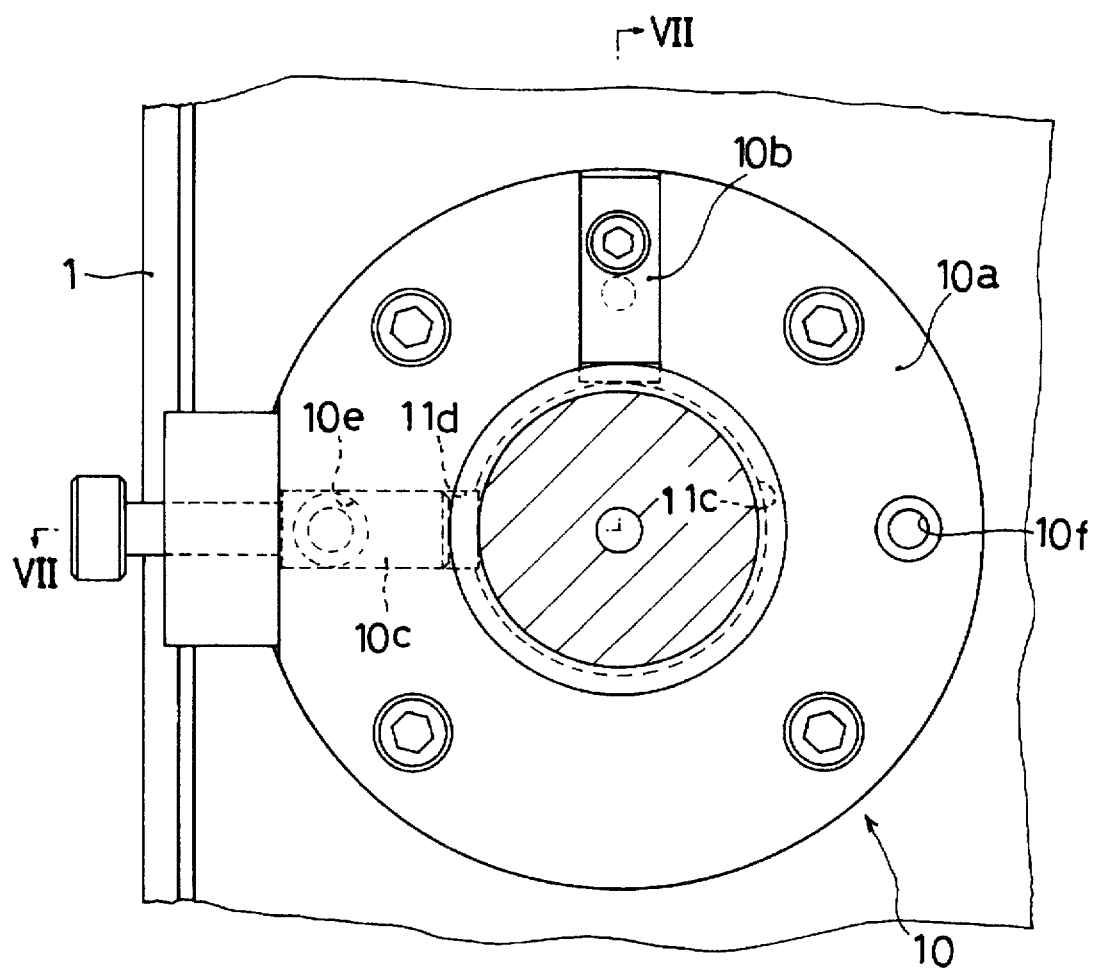
FIG. 6 is an enlarged cross-sectional view taken along the line VI—VI in FIG. 4.

The tool mounting member 10 is provided therein, as shown in FIGS. 6 and 7, with an annular member 10a which can receive therein the tool holder 11 with a clearance therebetween. The annular member 10a is provided with a pull-lock piece 10b which prevents the tool holder 11 from being pulled out of position, by engaging with an annular groove 11c formed on an outer circumference of the tool holder 11. A vertical groove 11d which extends from the annular groove 11c rearwards is formed in an outer circumference of the tool holder 11. The tool holder 11 can thus be pulled into, or pulled out of, the annular member 10a in a state in which the vertical groove 11d coincides with the pull-lock piece 10b. Further, a rotation-lock piece 10c engageable with the vertical groove 11d is provided in the annular member 10a in a position circumferentially away from the pull-lock piece 10b. After the tool holder 11 has been inserted into the annular member 10a in a phase in which the vertical groove 11d coincides with the pull-lock piece 10b, the tool holder 11 is rotated such that the vertical groove 11d coincides with the rotation-lock piece 10c. It is thus so arranged that the tool holder 11 is prevented from rotating by engaging the rotation-lock piece 10c with the vertical groove 11d, and also is prevented from dropping out of the tool mounting member 10.

The rotation-lock piece 10c is inserted into the annular body 10a in a manner to be slidable in the diametrical direction and also to be urged diametrically inwards by a spring 10d. By pulling the rotation-lock piece 10c outwards out of engagement with the vertical groove 11d, the rotation locking or rotation prevention of the tool holder 11 is released, whereby the tool holder 11 can be attached to, or detached from, the tool mounting member 10.

At the lower end of the spindle head 12, there is mounted a cam member 12b which is in a shape of a tapered pin engageable with the rotation-lock piece 10c. When the tool mounting member 10 that has been indexed to the machining position A is moved up towards the spindle head 12 by the upward movement of the second supporting body 8 relative to the first supporting body 7, the cam member 12b gets engaged with a tapered cam hole 10e formed in the rotation-lock piece 10c, through a guide hole 1b formed in the circumferential wall portion of the turret head 1 and through the annular body 10a. The rotation-lock piece 10c is automatically receded diametrically outwards to thereby release the rotation prevention of the tool holder 11. In this manner, when the tool holder 11 of the tool mounting member 10 that is in the machining position A is engaged with the spindle 13, the tool holder 11 can be freely rotated by the spindle 13.

Further, at the lower end of the spindle head 12, there is provided a cutting fluid joint 12d which contains therein a check valve 12c. When the tool mounting member 10 that has been indexed to the machining position A is moved up towards the spindle head 12, the cutting fluid joint 12d is fitted through the peripheral wall portion of the turret head 1 into a through hole 10f which is formed in the annuler body 10a. A coupler flange 11e is fitted to an outer circumference of the tool holder 11 via a bearing (not illustrated) so as to be rotatable relative to each other. On the coupler flange 11e there is mounted an inlet port 11f which is fitted into the through hole 10f. The cutting fluid is thus arranged to be supplied from the joint 12d to the tool 11a via the inlet port 11f, a passage inside the coupler flange 11e, and a passage inside the tool holder 11.

An explanation will now be made about the operation or function of the turret type of machine tool which is constituted as explained above.

When the tool is exchanged, the spindle 12 is stopped by making the tool holder 11 of the tool mounting member 10 that is present in the machining position A in such a phase that the vertical groove 11d coincides with the rotation-lock piece 10c. Also the fixing of the tool holder 11 by the pull stud mechanism is released. In this state, the first supporting body 7 is moved up by the elevating table 5 beyond a predetermined position in which the guide bar 8f on the second supporting body 8 comes into abutment with the stopper arm 8h. According to these operations, the second supporting body 8 moves down relative to the first supporting body 7 against the urging force of the coil spring 8g. The tool holder 11 of the tool mounting member 10 that is in the machining position A is released below the spindle 13. At this time, the rotation-lock piece 10c is released from the restraint by the cam member 12b and is engaged with the vertical groove 11d of the tool holder 11 by the urging force of the spring 10d. The tool holder 11 is thereby prevented from rotating. Thereafter, the tool holder 11 is held in the tool mounting member 10 while being prevented by the pull-lock piece 10b from being pulled out of position.

Then, the turret head 1 is rotated for indexing so that a required tool mounting member 10 is indexed to the machining position A. After indexing, the elevating table 5 is lowered to a predetermined position. According to these operations, the second supporting body 8 is moved up relative to the first supporting body 7 by the urging force of the coil spring 8g. The cam member 12b is first fitted into the guide hole 1b of the turret head 1, and the tool mounting member 10 that has been indexed to the machining position A is aligned in position relative to the spindle head 12. Then, the tapered portion 11b of the tool holder 11 held by the tool mounting member 10 is fitted into the tapered hole 13a of the spindle 13, whereby the tool holder 11 is engaged with the spindle 13 with accurate aligning. At this time, the rotation-lock piece 10c is receded outwards by the cam member 12b to thereby release the rotation prevention of the tool holder 11. Thereafter, the tool holder 11 is fixed by fitting into the spindle 13 by means of the pull stud mechanism. In this state, the turret head 1 is moved down together with the elevating table 5 while rotating the tool holder 11 by the spindle 13. The machining work is thus performed with the tool 11a that is mounted on the tool holder 11. Then, during the time to the next exchanging of the tool, the elevating table 5 is moved up and down within the limit of the above-described predetermined position as an upper end position, while moving the turret head 1 back and forth and to the right and left by the movements of the shift table 3 and the shift column 4. The machining of a plurality of portions of the workpiece is thus performed. After the machining has been finished, the elevating table 5 is lifted beyond the predetermined position to thereby exchange the tool as described above.

Figure 8:
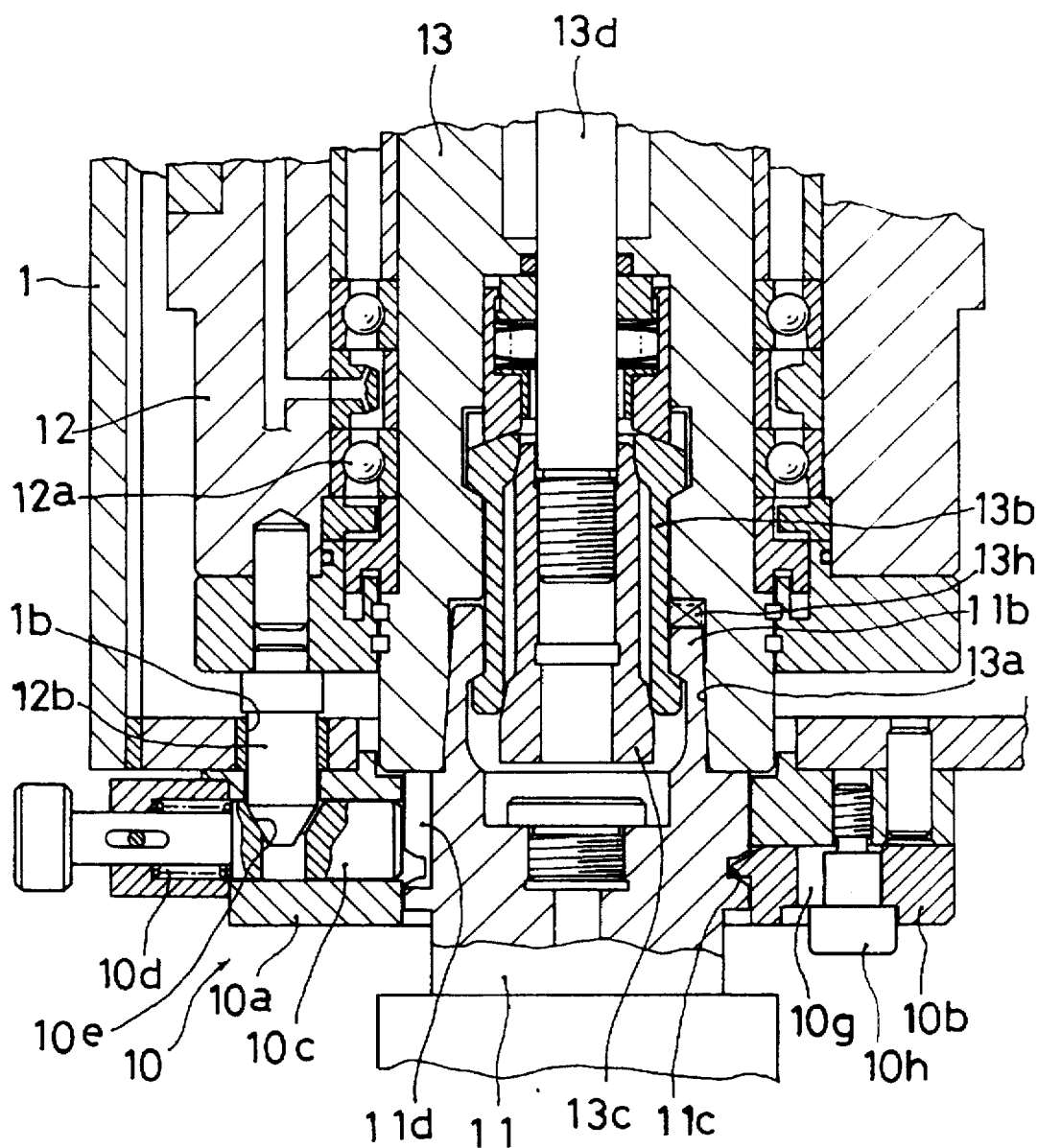
FIG. 8 is a cross-sectional view of a second embodiment of the present invention corresponding to FIG. 7, in which the construction of a tool mounting member is modified.

In the above-described first embodiment, the pull-lock piece 10b is fixed to the annular body 10a. However, as shown in FIG. 8, a bolt through hole in the pull-lock piece 10b may be formed into an elongated hole 10g so that, by loosening a bolt 10h, the pull-lock piece 10b can be moved in the diametrical direction. According to this arrangement, the pull-lock piece 10b is receded diametrically outwards to thereby remove it out of engagement with the annular groove 11c. The tool holder 11 can thus be attached to, or detached from, the tool mounting member 10. In this case, the vertical groove 11d and the rotation-lock piece 10c will become unnecessary in principle. However, the phase positioning of the tool holder 11 is still necessary in engaging the key 13h inside the tapered hole 13a of the spindle 13 with the keyway in the tapered portion 11b of the tool holder 11. Therefore, in the embodiment shown in FIG. 8, there are provided the vertical groove 11d and the pull-lock piece 10c as in the above-described first embodiment.

Figure 9:
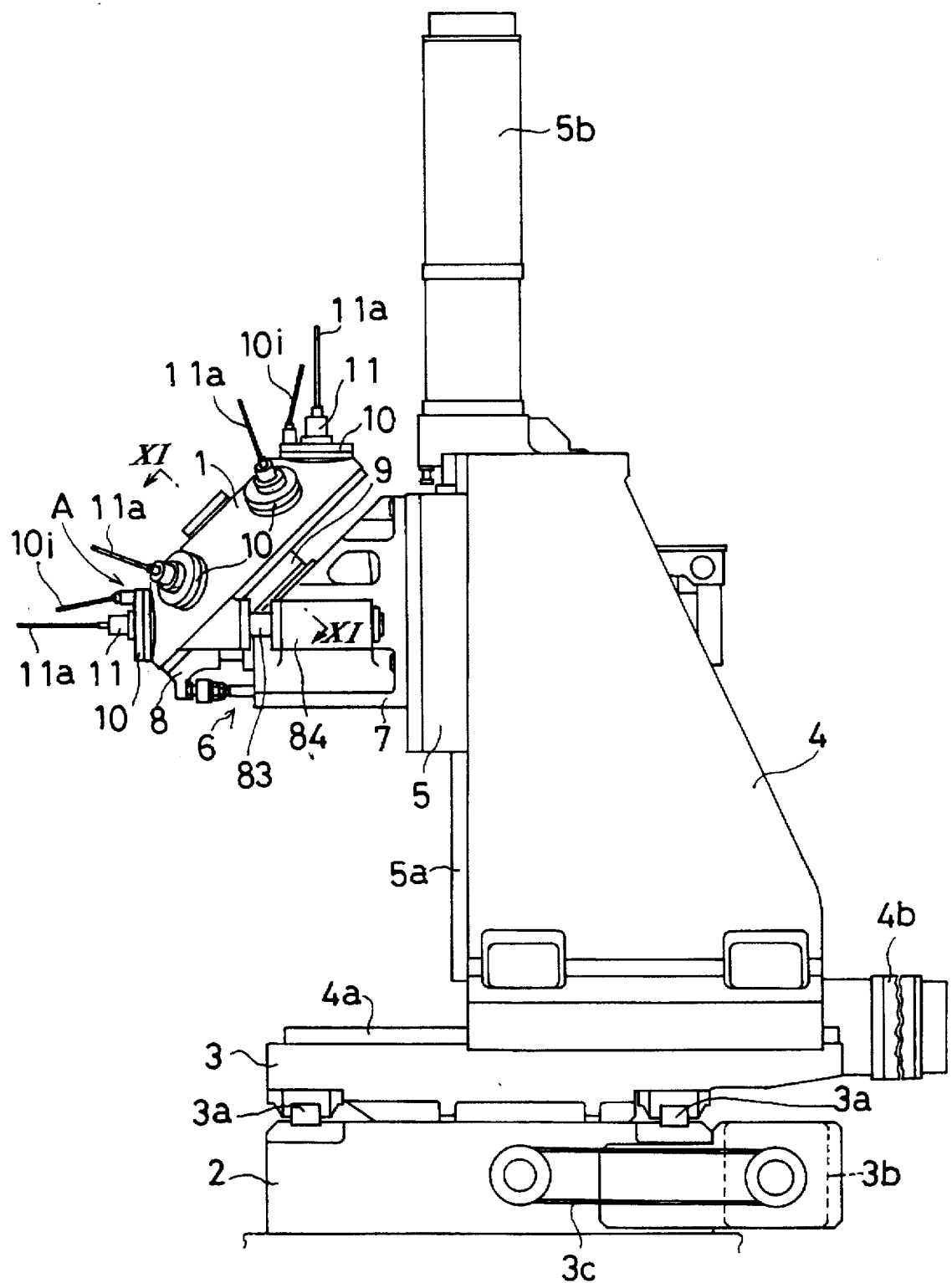
FIG. 9 is a side view of a third embodiment of the turret type of machine tool of the present invention.
Figure 10:
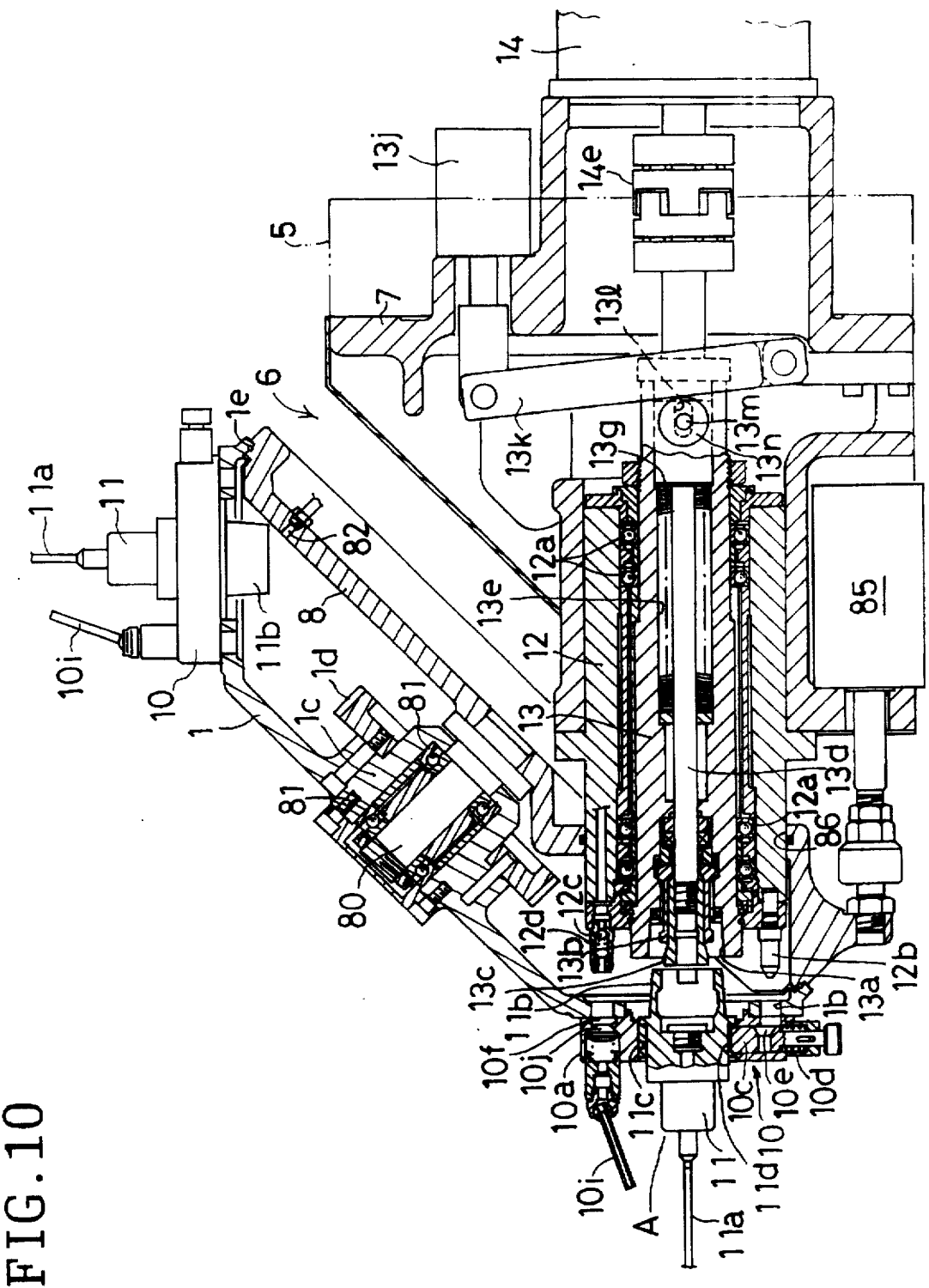
FIG. 10 is a enlarged cross-sectional view of an important portion thereof.
Figure 11:
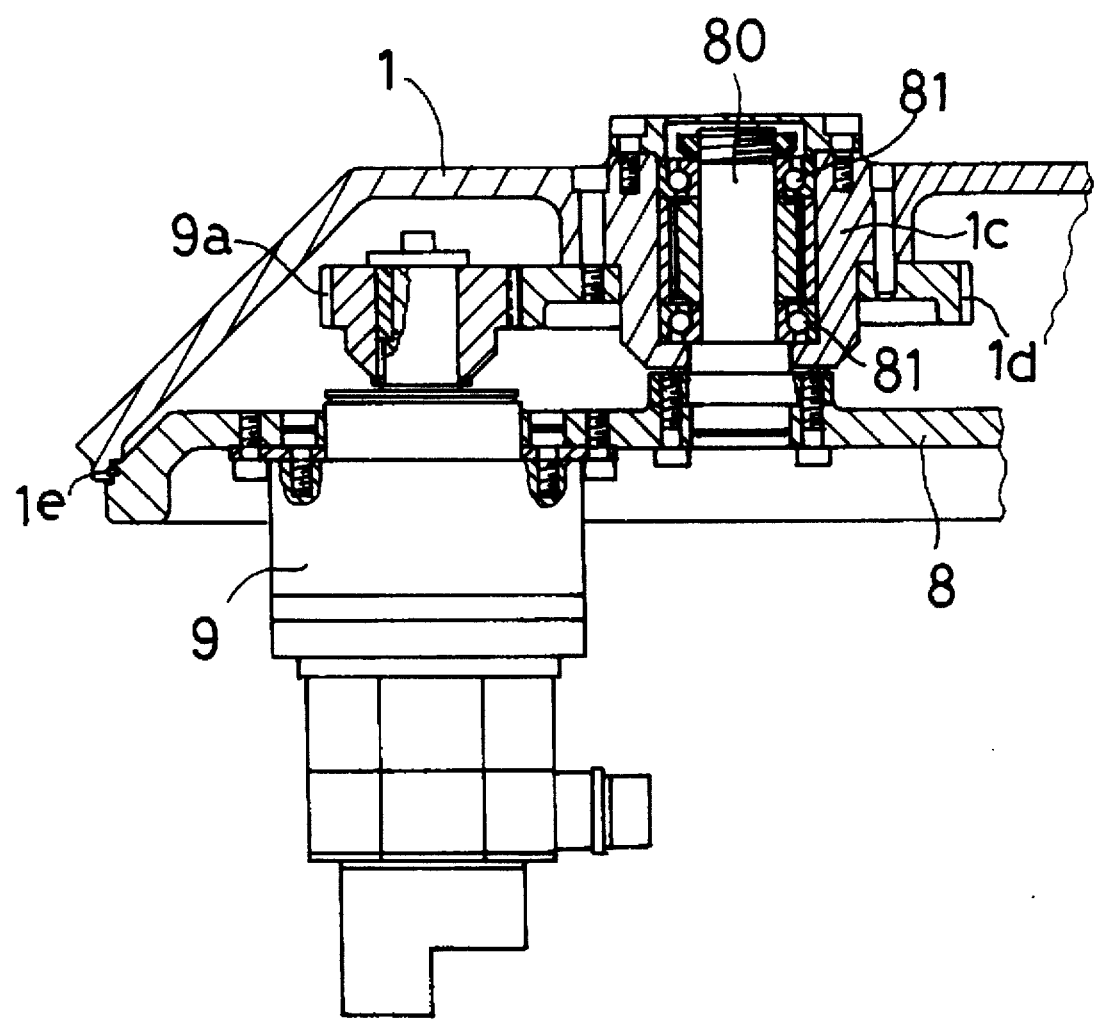
FIG. 11 an enlarged cross-sectional view taken along the line XI—XI in FIG. 9.

An explanation has so far been made about an embodiment in which the present invention is applied to a turret type of vertical machine tool which has an axis of machining in the vertical direction. The present invention can also be applied to a turret type of horizontal machine tool which has an axis of machining in the horizontal direction. FIGS. 9 through 11 show a third embodiment in which the present invention is applied to a turret type of horizontal machine tool.

A moving mechanism of the third embodiment is made up, as in the above-described first embodiment, of a shift table 3 which is movable in the lateral direction, a shift column 4 which is movable in the back and forth direction, and an elevating table 5 which is movable in the vertical direction. The same reference numerals are affixed to the same constituent members as in the first embodiment and their explanations are omitted.

A turret head 1 is formed into a conical shape. Tool mounting members 10 are disposed in a plurality of circumferential portions of the turret head 1 such that the axial line of each tool mounting member 10 looks towards the normal line of the conical surface. The turret head 1 is rotatably supported for indexing in an upwardly inclined posture on a front surface of an elevating table 5 via a supporting body 6. An axial line (axis of machining) of the tool mounting member 10 that has been indexed to the bottom machining position A of the turret head 1 is arranged to become horizontal in the back and forth direction. Then, the turret head 1 is moved forwards by the advancement of the shift column 4. The machining work such as drilling or the like is thus performed with a tool 11a mounted on a tool holder 11 to be held by the tool mounting member 10 that has been indexed to the machining position A.

A supporting body 6 is made up, as shown in FIG. 10, of a first supporting body 7 which is fixed to the front surface of the elevating table 5, and a second supporting body 8 of a disc shape which is disposed in front of the first supporting body 7 in an upwardly inclined posture. To the second supporting body 8 there is attached a shaft 80 which protrudes upwards in an inclined posture. A cylindrical member 1c which is provided in a projecting manner on a rear central portion of the turret head 1 is fitted to the shaft 80 via a bearing 81. The turret head 1 is thus rotatably supported on the second supporting body 8 in an upwardly inclined posture. A gear 1d is mounted on an outer circumference of the cylindrical member 1c of the turret head 1 and, as shown in FIG. 11, an index motor 9 having that gear 9a on an output shaft which engages with the gear 1d is mounted. It is thus so arranged that the turret head 1 can be rotated for indexing by the operation of the index motor 9. In addition, an outer circumferential portion of the turret head 1 is overlapped with an outer circumferential portion of the second supporting body 8. A labyrinth groove 1e is formed in this overlapped portion to seal the space inside the turret head 1 by this labyrinth groove 1e. Air whose pressure is higher than atmospheric pressure is supplied from an air port 82 formed in the second supporting body 8 to the space to prevent foreign matters from entering into the space.

The second supporting body 8 is provided, as shown in FIG. 9, with a guide bar 83 which extends backwards in a projecting manner. This guide bar 83 is inserted into a guide sleeve 84 which is formed in the first supporting body 7. The second supporting body 8 is supported on the first supporting body 7 so as to be relatively movable in the back and forth direction, i.e., along the axis of machining. As shown in FIG. 10, a cylinder 85 which is connected to the second supporting body 8 is mounted on the first supporting body 7. It is thus so arranged that the second supporting body 8, i.e., the turret head 1, can be moved back and forth by the cylinder 85 relative to the first supporting body 7.

The first supporting body 7 has therein, in a horizontal posture, a spindle head 12 which is similar to that of the first embodiment, such that a spindle 13 which is rotatably supported in the spindle head 12 coincides with the horizontal axis of machining. The front end portion of the spindle head 12 is inserted into (or contained in) the space in the turret head 1 via a through hole 86 which is formed in the second supporting body 8. When the turret head 1 is receded relative to the first supporting body 7, a tapered portion 11b at a rear end of the tool holder 11 held by the tool mounting portion 10 that is present in the machining position A is fitted into a tapered hole 13a at a front end of the spindle 13. When the turret head 1 advances relative to the first supporting body 7, the tool holder 11 is released out of the spindle 13.

The spindle 13 is connected via a joint 14e to a spindle motor 14 which is mounted in a horizontal posture on the rear surface of the first supporting body 7. The spindle 13 is provided therein, as shown in FIG. 10, with a pull stud mechanism which fixes, by means of fitting or seizing, a tapered portion 11b of the tool holder 11 to a tapered hole 13a of the spindle 13. This pull stud mechanism is not particularly different from that in the first embodiment and, therefore, the same reference numerals are affixed to the same constituting members as in the first embodiment. However, unlike that of the first embodiment, in the pull stud mechanism in the third embodiment, a drawing bar 13d is driven, via a lever 13k, by means of a cylinder 13j which is mounted on the first supporting body 7. In other words, at the rear end of the drawing bar 13d, there is fixed a cross pin 13m which extends in a projecting manner diametrically outwards of the spindle 13 through an elongated hole 131 formed in the spindle 13 to extend in the back and forth direction. A roller 13n to abut with the lever 13k is attached to the cross pin 13m. When the lever 13k is swung forwards by the cylinder 13j, the drawing lever 13d is pushed forwards via the roller 13n, whereby a collet 13b is reduced in diameter.

The tool mounting member 10 is provided therein with an annular member 10a, in the same way as in the first embodiment. Further, the annular member 10a is provided therein with a pull-lock piece (not illustrated due to the position in which the figure is sectioned) which engages with an annular groove 11c in the outer circumference of the tool holder 11, and a rotation-lock piece 10c which can be engaged with a vertical groove 11d in the outer circumference of the tool holder 11. When the turret head 1 is receded relative to the first supporting body 7, a cam member 12b of a tapered pin shape which is provided in the front end of the spindle head 12 is engaged with a tapered cam hole 10e of the rotation-lock piece 10c provided in the tool mounting member 10 that is located in the machining position A, through a guide hole 1b which is formed in the turret head 1. The rotation-lock piece 10c is thus receded diametrically outwards against a spring 10d, whereby the rotation prevention of the tool holder 11 is released.

Further, at the front end of the spindle head 12, there is mounted a cutting fluid joint 12d containing therein a check valve 12c, like in the first embodiment. When the turret head 1 is receded relative to the first supporting body 7, the cutting fluid joint 12d is fitted into a through hole 10f which is formed in the annular body 10a of the tool mounting member 10 that is present in the machining position A. In the third embodiment, a nozzle 10i which is in communication with the through hole 10f is provided in the annular body 10a so that the cutting fluid can be supplied to the tool 11a through the nozzle 10i. In addition, there is mounted a check valve 10j, which is pushed open by the insertion of the cutting fluid joint 12d, into the through hole 10f. In a state in which the cutting fluid joint 12d is released off the through hole 10f by the advancement of the turret head 1 relative to the first supporting body 7, the check valve 10j is closed to thereby prevent the cutting fluid from flowing back to the space inside the turret head 1 via the through hole 10f.

When a workpiece is to be machined, the turret head 1 is rotated for indexing in a state in which the turret head 7 is advanced relative to the first supporting body 7 to thereby index a required tool mounting member 10 in the machining position A. Then, the turret head 1 is receded relative to the first supporting body 7 to thereby connect the tool holder 11 held by the tool mounting member 10 in the machining position A to the spindle 13. Thereafter, by the right and left movement of the shift table 3 and the vertical movement of the elevating table 5, the tool holder 11 is aligned in position in the right and left direction as well as in the vertical direction. In this state, the shift column 4 is advanced to thereby advance the turret head 1 together with the first supporting body 7. The machining of the workpiece is thus performed by the tool mounted on the tool holder 11a.

It is readily apparent that the above-described turret type of machine tool meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A turret type of machine tool comprising:
   a turret head having tool mounting members in a plurality of circumferential portions thereof;
   a supporting body for rotatably supporting said turret head such that an arbitrary one of said tool mounting members can be selectively indexed to a predetermined machining position;

a moving mechanism for advancing or receding said supporting body along an axis of machining, said axis of machining being defined to be an axis of a tool mounting member in said predetermined machining position;

wherein said supporting body is divided into a first supporting body connected to said moving mechanism and a second supporting body rotatably supporting said turret head such that said second supporting body is supported by said first supporting body in a relatively movable manner along said axis of machining;

a spindle head for rotatably supporting a spindle is fixed to said first supporting body such that said spindle coincides with said axis of machining, at least a front end of said spindle head being contained in a space inside said turret head, whereby a tool holder held in a tool mounting member that has been indexed to said machining position is engaged with, or detached from, said spindle by a movement of said second supporting body relative to said first supporting body along said axis of machining;

an urging means for urging said second supporting body rearwards relative to said first supporting body along said axis of machining; and a restricting means for restricting a receding movement of said second supporting body relative to said first supporting body rearwardly along said axis of machining, said receding movement initially being at a predetermined position whereby said second supporting body is advanced forwardly along said axis of machining relative to said first supporting body by further receding of said first supporting body after said second supporting body has receded to said predetermined position so that said tool holder is detached from said spindle.

2. The turret type of machine tool according to claim 1, further comprising a means for supplying air higher in pressure than atmospheric pressure into said space inside said turret head.

3. The turret type of machine tool according to claim 2, further comprising:

an urging means for urging said second supporting body rearwardly relative to said first supporting body along said axis of machining; and a restricting means for restricting a receding movement of said second supporting body relative to said first supporting body rearwardly along said axis of machining, said receding movement being at a predetermined position whereby said second supporting body is advanced forwardly along said axis of machining relative to said first supporting body by further receding of said first supporting body after said second supporting body has receded to said predetermined position so that said tool holder is detached from said spindle.

4. The turret type of machine tool according to claim 1, wherein a tapered hole for engaging with a tapered portion at a rear end of said tool holder is formed at a front end of said spindle.

5. The turret type of machine tool according to claim 2, wherein a tapered hole for engaging with a tapered portion at a rear end of said tool holder is formed at a front end of said spindle.

6. The turret type of machine tool according to claim 3, wherein a tapered hole for engaging with a tapered portion at a rear end of said tool holder is formed at a front end of said spindle.

7. The turret type of machine tool according to any one of claims 1, 3, 5, 6 further comprising:

an annular body which is provided in said tool mounting member and which receives therein said tool holder with a clearance therebetween; and a pull-lock piece provided in said annular body to prevent said tool holder from being pulled out of position, by engaging with an annular groove formed in an outer circumference of said tool holder.

8. The turret type of machine tool according to claim 7, wherein said tool holder has a vertical groove formed to extend rearwardly in an outer circumference thereof such that said tool holder can be pushed into, or pulled out of, said annular body in a state in which said vertical groove coincides with said pull-lock piece, wherein said annular body is provided with a rotation-lock piece which is engaged with, or detached from, said tool holder so as to hold said tool holder in such a phase that said vertical groove is out of coincidence with said pull-lock piece, and wherein said spindle head is provided with a cam member for releasing a rotation-lock piece of a tool mounting member that is present in said predetermined machining position when said turret head is receded rearwardly along said axis of machining relative to said spindle head.

* * * * *